Aug. 23, 1927. 1,639,728
J. HARRIS
INDUCTION ELECTRICITY METER
Filed Jan. 25, 1926
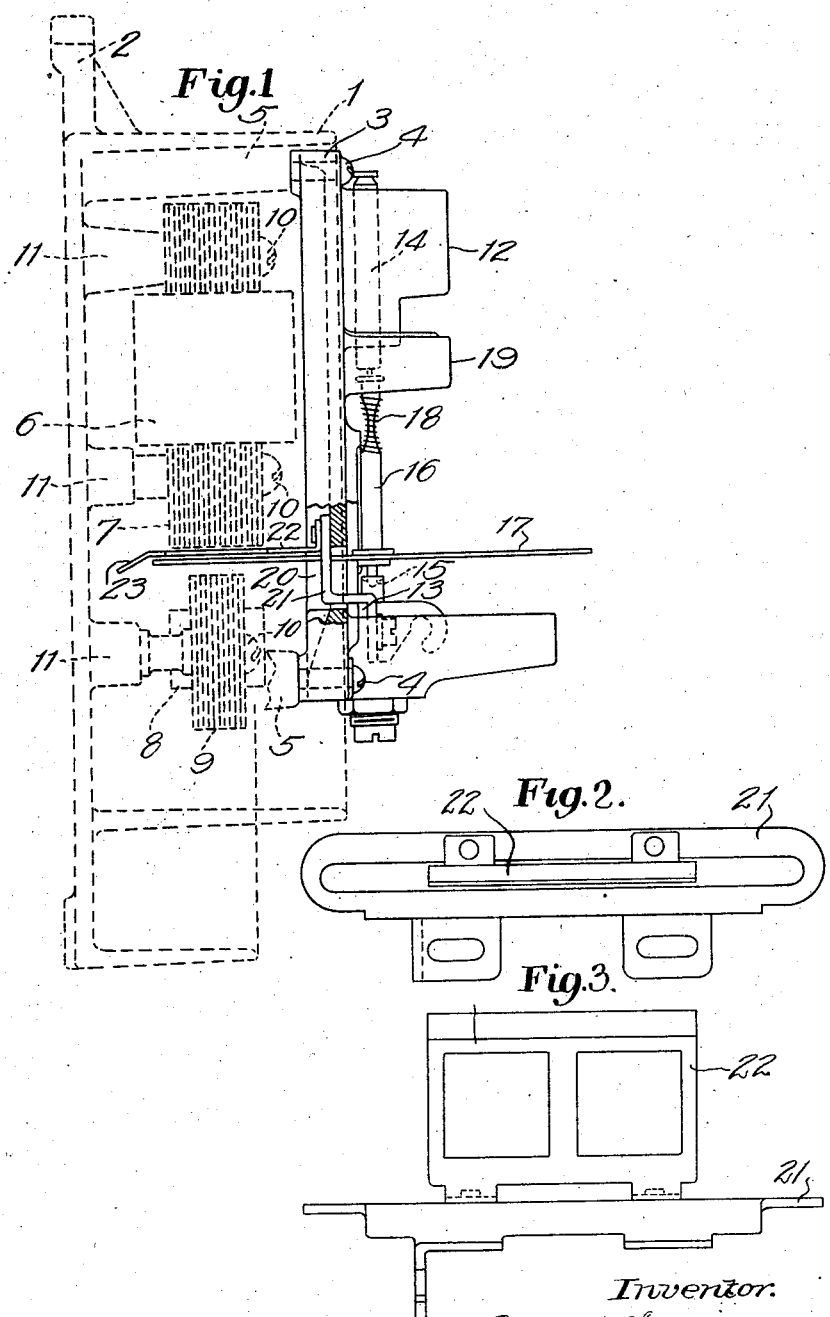

Patented Aug. 23, 1927.

1,639,728

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

INDUCTION ELECTRICITY METER.

Application filed January 25, 1926. Serial No. 83,579.

My invention relates to induction electricity meters of the type employing a pressure electro-magnet, a current electro-magnet spaced apart from the pressure electro-magnet, a main support upon which at least one of said electro-magnets is mounted, a metallic armature disc extending into the space between said magnets, a spindle carrying said disc, a supplemental support secured to the main support, and spindle bearings carried by the supplemental support. The parts carried by the two supports are respectively assembled therewith, whereafter the two supports are assembled with the disc extending into the space between said electro-magnets.

Hitherto, extreme caution had to be exercised in order to insert the disc directly into the space between the magnets without having the disc strike a magnet in the process of assembling, to avoid injury of the disc and of the jewel mountings for the spindle carrying the disc. I guard against the injury of the disc and the bearings for the spindle by providing a guard structure upon the supplemental support, this guard structure also extending into the space between the electro-magnets and beyond the periphery of the disc. In those meters having both of their electro-magnets mounted upon the main support, I also extend the guard structure across the periphery of the disc so as to prevent the armature disc from striking either electro-magnet, in the process of assembling the two supports. In induction watt-hour meters, it is customary to provide a metallic friction compensating plate so positioned upon the supplemental support that when the two supports are assembled, it will be so positioned as to have inductive relation with the pressure electro-magnet of a nature to furnish a supplemental torque which will offset the friction between the spindles and their bearings. In a meter thus constructed, I so mount the friction compensating plate upon the supplemental support that it will also project into the space between the electro-magnet, when the two supports are assembled, and I provide a portion upon this plate which extends beyond the periphery of the disc and preferably across such periphery, for the purpose stated. In the preferred embodiment of the invention, such portion is an integral continuation of said plate.

While the device of my invention is serviceable in assembling meters where manufactured, it is also of especial service in repairing the meters after installation as it guards against injury of the armatures and the jewel bearings in the hands of unskilled or inexperienced workmen.

My invention will be more fully explained in connection with the accompanying drawing showing the preferred embodiment thereof and in which Fig. 1 is a side view illustrating the main meter support and the electro-magnets thereon by dotted lines and the supplemental support by solid lines, portions being broken away, some portions of parts of the supplemental support and parts carried by the supplemental support being also shown by dotted lines; Fig. 2 is a rear elevation of the friction compensating plate and a supporting bracket therefor; and Fig. 3 is a plan view of the parts appearing in Fig. 2.

The main meter support 1 is in the form of a meter casing body closed at its rear side and furnished with a mounting lug 2 by which it may be attached to a wall or other mounting, the nature of such casing body being so well-known by those familiar with the art as to require no extended description. The supplemental support 3 is suitably secured to the main support, as by means of screws 4 passing through the supplemental support into mounting lugs 5 formed integrally with the main support. The meter is equipped with a pressure electro-magnet that is inclusive of a pressure winding 6 to be connected across the mains of the system or otherwise to be subject to the pressure of the current traversing the mains and a soft iron laminated core 7 about which the winding is disposed. The meter is also equipped with a current electro-magnet that is inclusive of a current winding 8 to be connected in series with a main of the system or otherwise subject to the current of the system and a soft iron laminated core 9 about which the winding 8 is disposed. Both of these electro-magnets are shown as being secured to the main support by means of screws 10 passing through the cores of the magnets and into mounting lugs 11 carried by and projecting forwardly from the back wall of the main support. I do not wish to be limited, however, to the mounting of both magnets upon the main support.

The supplemental support is provided with forwardly projecting lugs 12 and 13 which respectively carry the upper sleeve bearing 14 and the lower step bearing 15 for the upright meter spindle 16. This spindle carries the aluminum or other metallic armature disc 17 which projects into the space which intervenes between the cores of the two magnets to be in inductive relation thereto, whereby the armature and its spindle are rotated proportionately to the wattage. The spindle is provided with the usual worm gear 18 in driving relation to a counting train, not shown, which is secured upon the front ends of mounting lugs 19 that project forwardly from the supplement support. The spindle and its bearings are usually provided upon the front side of the supplemental support, this support being preferably made of iron so as to constitute a magnetic shield, in accordance with common practice. The armature disc projects rearwardly through an opening 20 formed in the supplemental support, the two supports being so assembled that this armature disc will project into the space between the electromagnets. A bracket 21 is mounted upon the supplemental support and carries the friction compensating plate 22 which overlies the disc 17 and projects into the space between the magnets and between the pressure magnet and the disc so as to cooperate with the pressure magnet to produce a supplemental torque that serves to compensate for friction at the bearings of the spindle. In accordance with my invention, this friction compensating plate extends rearwardly to a point beyond the periphery of the disc so that it, instead of the disc, will strike the pressure magnet, in the process of assembling the two supports, in the event that the plate and armature disc are not in suitable register with the space between the magnets as the supplemental support is being approached to the main support, the disc being thereby guarded from injury. The friction compensating plate is provided with a portion 23, preferably an integral continuation of the plate, which extends across the periphery of the disc so that the disc will be further guarded. While I prefer to so construct the friction compensating plate that it also serves as a guard structure, the invention is not to be limited to such employment.

Having thus described my invention, I claim:—

1. In an induction electricity meter, the combination with a driving element including a pressure electro-magnet and a current electro-magnet spaced apart from the pressure electro-magnet; of a main support upon which said electro-magnets are mounted; a metallic armature disc extending into the space between said magnets; a spindle carrying said disc; a supplemental support secured to the main support; spindle bearings carried by the supplemental support; and a guard structure carried by the supplemental support and also extending into the space between said electro-magnets and beyond the periphery of the disc and across the periphery of the disc.

2. In an induction electricity meter, the combination with a driving element including a pressure electro-magnet and a current electro-magnet spaced apart from the pressure electro-magnet; of a main support upon which at least one of said electro-magnets is mounted; a metallic armature disc extending into the space between said magnets; a spindle carrying said disc; a supplemental support secured to the main support; spindle bearings carried by the supplemental support; and a metallic friction compensating plate carried by the supplemental support and having a part also extending into the space between said electro-magnets and beyond the periphery of the disc.

3. In an induction electricity meter, the combination with a driving element including a pressure electro-magnet and a current electro-magnet spaced apart from the pressure electro-magnet; of a main support upon which said electro-magnets are mounted; a metallic armature disc extending into the space between said magnets; a spindle carrying said disc; a supplemental support secured to the main support; spindle bearings carried by the supplemental support; and a metallic friction compensating plate carried by the supplemental support and having a part also extending into the space between said electro-magnets and beyond the periphery of the disc and having a part that extends across the periphery of the disc.

In witness whereof, I hereunto subscribe my name.

JESSE HARRIS.